3,476,412
TUBULAR CONNECTION DEVICE
Henry William Demler, Sr., Lebanon, Pa., assignor to AMP Incorporated, Harrisburg, Pa.
Continuation-in-part of application Ser. No. 427,010, Jan. 21, 1965. This application Mar. 5, 1968, Ser. No. 710,457
Int. Cl. F16l 21/06, 35/00, 19/08
U.S. Cl. 285—322                        2 Claims

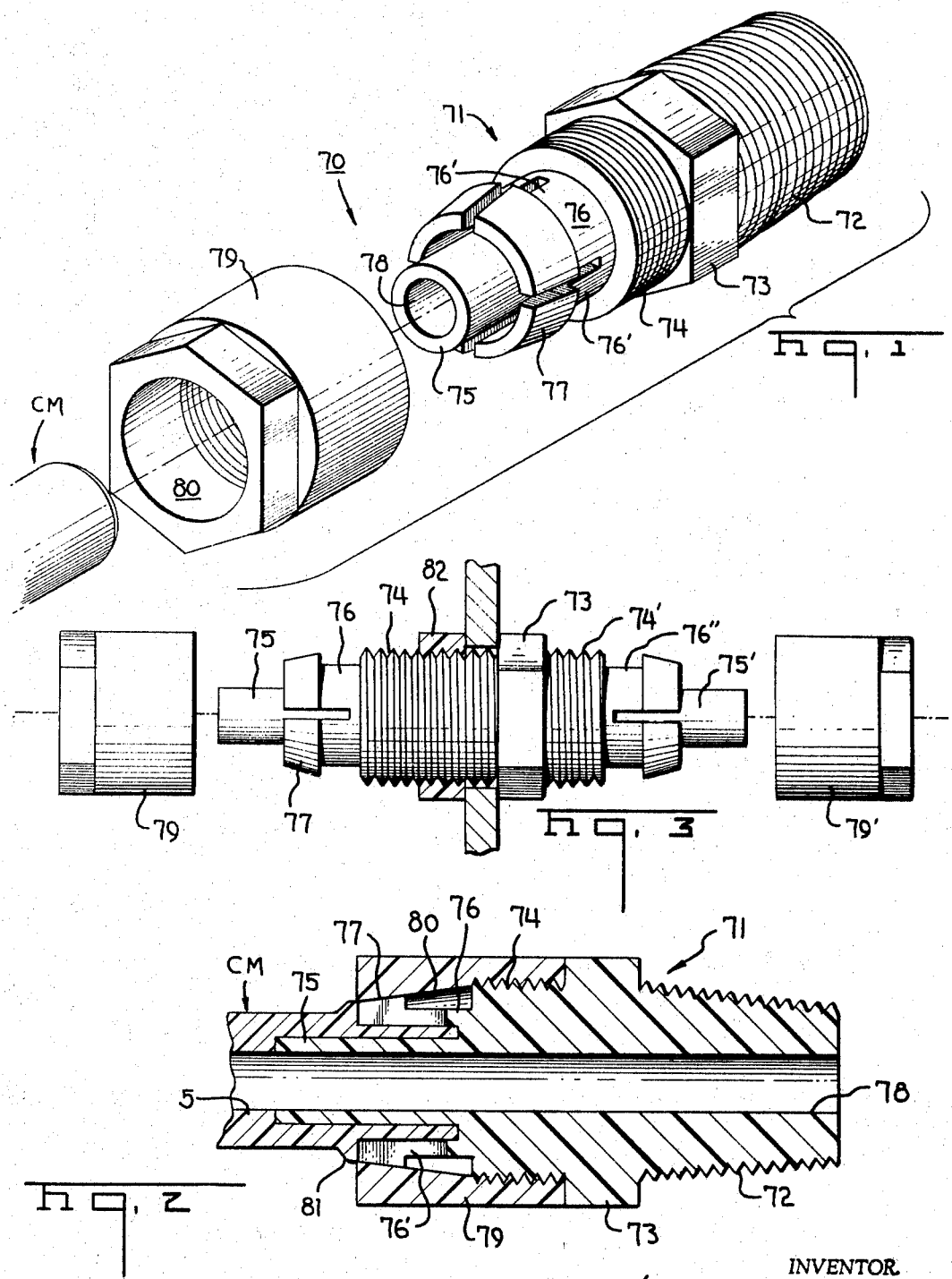

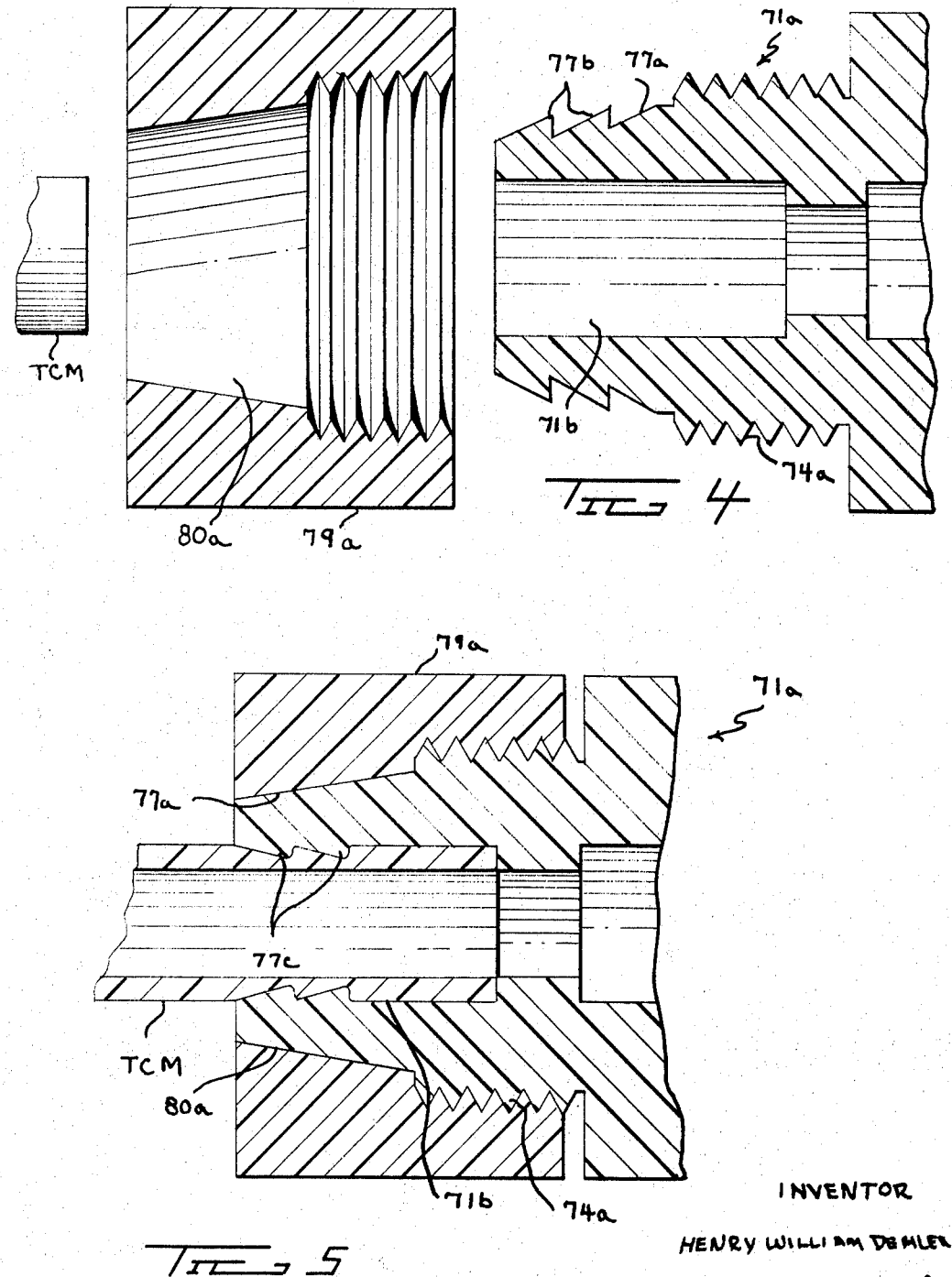

ABSTRACT OF THE DISCLOSURE

A tubular connection device comprises a body member of yieldable material in which an end of a tubular conduit member is to be disposed, a section of the body member overlying the end of the tubular conduit member having an outer tapered surface provided with serrations therealong, a nut member threadably mounted on the body member and having an inner tapered surface mateable with the outer tapered surface thereby reforming the serrations on the interior surface of the body member whereby the end of the conduit member is deformed in accordance with the configuration of the serrations to increase sealing and tensile characteristics of the connection so formed.

CROSS REFERENCE TO RELATED APPLICATION

This application is a continuation-in-part application of copending application, Ser. No. 427,010, filed Jan. 21, 1965, and now abandoned.

This invention relates to tubular connection devices and more particularly to tubular connection devices for sealingly connecting to ends of tubular conduit members.

An object of the invention is to provide a tubular connection device having tapered mateable surfaces between a body member and nut to neck down the section of the body member carrying the tapered surface into sealing engagement with an end of a tubular conduit member when the nut is threadably moved along the body member.

Another object of the invention is the provision of serrations on the tapered surface which are reformed on an interior surface of the body member as a result of the pressure between the tapered surfaces and the flowability of the material of the body member; the reformed serrations deforming the end of the tubular conduit member in accordance with the configuration of the serrations thereby increasing the sealing and tensile characteristics of the connection.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purpose of illustration in order that others skilled in the art may fully understand the invention and the principles thereof and the manner of applying it in practical use so that they may modify it in various forms, each as may be best suited to the conditions of a particular use.

In the drawings:

FIGURE 1 is an exploded perspective view of a tubular connection device;

FIGURE 2 is a cross-sectional view of FIGURE 1 in an assembled condition;

FIGURE 3 is an exploded side elevational view of an embodiment of the invention;

FIGURE 4 is an exploded cross-sectional view of another emodiment of the invention; and FIGURE 5 is a view similar to FIGURE 4 but in an assembled condition.

FIGURES 1 and 2 illustrate a connection member having a quick disconnect 70 therefor. Quick disconnect 70 comprises a body member 71 having external threads 72 for engagement with internal threads of a gauge or other type of element, a section 73 having an appropriate geometrical configuration (e.g., hexagonal) in order to be engaged by a wrench and another section 74 having external threads thereon. A tubular section 75 extends outwardly from section 74 as well as another section 76, which is coaxial with respect to and spaced outwardly from tubular section 75. Section 76 includes segments 76′ and each segment of section 76 has an outer beveled surface 77.

A bore 78 extends through body member 71. A nut member 79 has internal threads mateable with the threads of section 74 and a camming surface 80 for engagement with beveled surfaces 77 to move the segments of section 76 toward tubular section 75. The exterior surface of nut member 79, at the end containing camming surface 80, has an appropriate geometric configuration for engagement by a suitable wrench member to tighten nut member 79 onto body member 71.

With nut member 79 in a position back from section 73, one end of connection member CM of the type disclosed in Ser. No. 517,747, filed Dec. 30, 1965, and now Patent No. 3,378,282, is inserted onto tubular member 75 and part of the connection member is seated between tubular section 75 and segmented section 76, as illustrated in FIGURE 2. It will be noted that the connection member has an annular lip 81 which abuts against the outer ends of the segments of segmented section 76 in order to limit the movement of the part of the connection member between tubular section 75 and segmented section 76. The diameter of annular lip 81 is slightly less than the smallest diameter of camming surface 80 so that this surface can move relative to the annular lip during the tightening movement of nut member 79 onto body member 71. It is also to be noted that the ferrule member is removed from the end of the connection member to be inserted within body member 71. It is to be further noted that the inner end of the connection member extends beyond the point where segments 76′ begin. The dimensions of tubular section 75 are such that it fits within the connection member in the same manner that a tubular member fits in the other end of the connection member prior to it being crimped thereon. The opening in shoulder 5 of the connection member communicates with bore 78 of body member 71.

Now that one end of the connection member has been mounted on body member 71, nut member 79 is moved toward section 73 causing camming surface 80 via its engagement with beveled surfaces 77 to move the segments of segmented section 76 into tight engagement with the part of the connection member disposed between the segmented section and tubular section 75, thereby frictionally securing the nonferruled end of the connection member within quick disconnect 70.

This provides a satisfactory quick disconnect for one end of the connection member when it is necessary to connect and disconnect the connection member a number of times and such numerous connections and disconnections do not affect the integrity of the connection. Thus, quick disconnect 70 provides suitable means to allow a tubular member crimped to a connection member to be sealingly secured within the quick disconnect without being permanently secured thereto.

It is also within the purview of the present invention to place one end of plastic tubing onto tubular section 75 and segmented section 76 is moved into tight engagement therewith via camming surface 80 of nut member 79. Section 76 may be continuous, non-segmented and yieldable and tubular section 75 may be eliminated when a rigid tubular member is to be connected within the disconnect. If plastic tubing is to be used in this disconnect, then a hollow rivet insert is placed within the plastic tubing to provide a back-up member to effect the connection.

FIGURE 3 illustrates an embodiment of the quick disconnect wherein section 74 is made longer so that more external threads can be disposed thereon for receiving a nut element 82 to secure the quick disconnect in a panel member or a wall and to receive nut member 79 thereon. Sections 74', 76" and 75', which are similar to sections 74, 76 and 75, respectively, extend outwardly from the other side of section 73 and nut member 79', which is similar to nut member 79, is threadably engageable with section 74'. Thus, the embodiment of FIGURE 3 is a double-ended quick disconnect such that one end of the quick disconnect receives one end of a connection member and in like manner the other end of the quick disconnect receives the end of another connection member, thereby connecting two connection members together which, in turn, are crimped to tubular members. Tubular conduit members may be used in place of the connection members.

FIGURES 4 and 5 illustrate another embodiment of the invention. Tapered annular surface 77a is provided with serrations 77b defining ribs which are annular and of sawtooth configuration in section but they can be of any configuration. After an end of tubular conduit member TCM has been inserted within opening or bore 71b of body member 71a, nut member 79a, which has of course been placed on the conduit member or is loosely threaded onto threaded section 74a, is threadably tightened onto section 74a causing camming surface 80a to apply compressive pressure onto serrations 77b and tapered surface 77a. Serrations 77b are reformed along the surface of opening 71b as serrations 77c because of the flowability of the material and the formation of serrations 77c causes deformation of the end of the conduit member in accordance with the configuration of the reformed serrations. This increases the sealing and tensile characteristics of the connection.

The compressive pressure applied by camming surface 80a also necks down tapered surface 77a to the point where a sealed connection is effected and the reforming of serrations 77b from tapered surface 77a to the surface of opening 71b augments the forces of connection between the end of the conduit member and the connected device.

If the conduit member is rigid or substantially so, then the connection can be made without the use of any support of the conduit member, but, if the conduit member is soft or easily collapsible, an insert member is necessary within the end of the conduit member to provide back-up support when the connection device is applied to the end of the conduit member.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. In a coupling member adapted to form a seal with a length of cylindrical tubing having a smooth outer peripheral surface at one end thereof, a one-piece body member of yieldable material having a first section and a second section, said body member provided with a bore into which the one end of the length of tubing is to be disposed, said first section having threads therealong, said second section extending outwardly coaxially from said first section and having a tapered exterior surface, rib means disposed along said tapered exterior surface, said rib means being annular and having angular surfaces, one of said angular surfaces being tapered and another of said angular surfaces being disposed substantially at right angles with respect to a longitudinal axis of said body member, a nut member provided with a threaded section adapted to be threadably engageable with said threads of said first section, and a conical surface provided along an internal surface of said nut member for engagement with said rib means and said tapered exterior surface during movement of said nut member along said threads so that said conical surface applies pressure onto said rib means thereby causing said rib means to flow inwardly and be reformed along said bore to deform the end of the tubing along the length thereof in accordance with the configuration of the reformed rib means with another of said angular surfaces being disposed in a direction after being reformed within said bore so as to resist pull-out pressure thereby to thereby increase the tensile of the connection between the coupling member and the tubing and for moving said second section into sealing engagement with the end of the tubing therealong.

2. In a coupling member according to claim 1 wherein said rib means comprises a plurality of annular rib means along said tapered exterior surface.

References Cited
UNITED STATES PATENTS

| | | | |
|---|---|---|---|
| 3,079,182 | 2/1963 | Appleton | 285—343 |
| 3,149,860 | 9/1964 | Hallesy | 285—18 |
| 3,425,452 | 2/1969 | Shaw | 285—343 X |
| 1,186,812 | 6/1916 | McFerran | 285—382.2 X |
| 1,659,268 | 2/1928 | Hooley | 285—322 |
| 2,880,722 | 4/1959 | Dickinson | 285—256 X |
| 3,295,870 | 1/1967 | Seablom | 285—343 X |

FOREIGN PATENTS

| | | |
|---|---|---|
| 1,328,420 | 4/1963 | France. |
| 818,250 | 8/1959 | Great Britain. |
| 1,016,874 | 9/1952 | France. |
| 859,875 | 9/1940 | France. |

THOMAS F. CALLAGHAN, Primary Examiner

U.S. Cl. X.R.

285—161, 331, 343, 382.2